United States Patent [19]
Katz et al.

[11] 3,990,046
[45] Nov. 2, 1976

[54] MULTIPLE TERMINAL COMPUTER SYSTEM WITH MIXED TERMINAL DATA RECEPTION RATES

[75] Inventors: Harold W. Katz; Gino Venturi; Melvin T. Bennett; Allan I. Edwin, all of Ann Arbor, Mich.

[73] Assignee: Interactive Systems, Inc., Ann Arbor, Mich.

[22] Filed: June 12, 1974

[21] Appl. No.: 478,643

[52] U.S. Cl. .................... 340/147 R; 340/147 LP; 340/163
[51] Int. Cl.² .......................................... H04Q 9/00
[58] Field of Search ...... 340/147 R, 147 LP, 152 R, 340/151, 163; 179/2 DP, 2 TV; 178/5.6

[56] References Cited
UNITED STATES PATENTS

| | | | |
|---|---|---|---|
| 3,299,210 | 1/1967 | Bandy | 340/152 R |
| 3,597,544 | 8/1971 | Kennedy | 179/2 DP |
| 3,662,110 | 5/1972 | Van Fossen | 179/2 DP |
| 3,668,307 | 6/1972 | Face | 340/152 X |

*Primary Examiner*—Harold I. Pitts
*Attorney, Agent, or Firm*—Krass & Young

[57] ABSTRACT

A computer system consists of a central station and a plurality of remote terminals, some having a relatively low data acceptance and/or transmission rate and others having a higher data rate. The communication link between the central station of the terminals consists of a low speed channel and a high speed channel. The terminals are permanently connected to receive signals over the low speed channel and a control signal, sent by the central station, to a particular addressed terminal over the low speed channel connects an associated terminal to the high speed channel.

13 Claims, 5 Drawing Figures

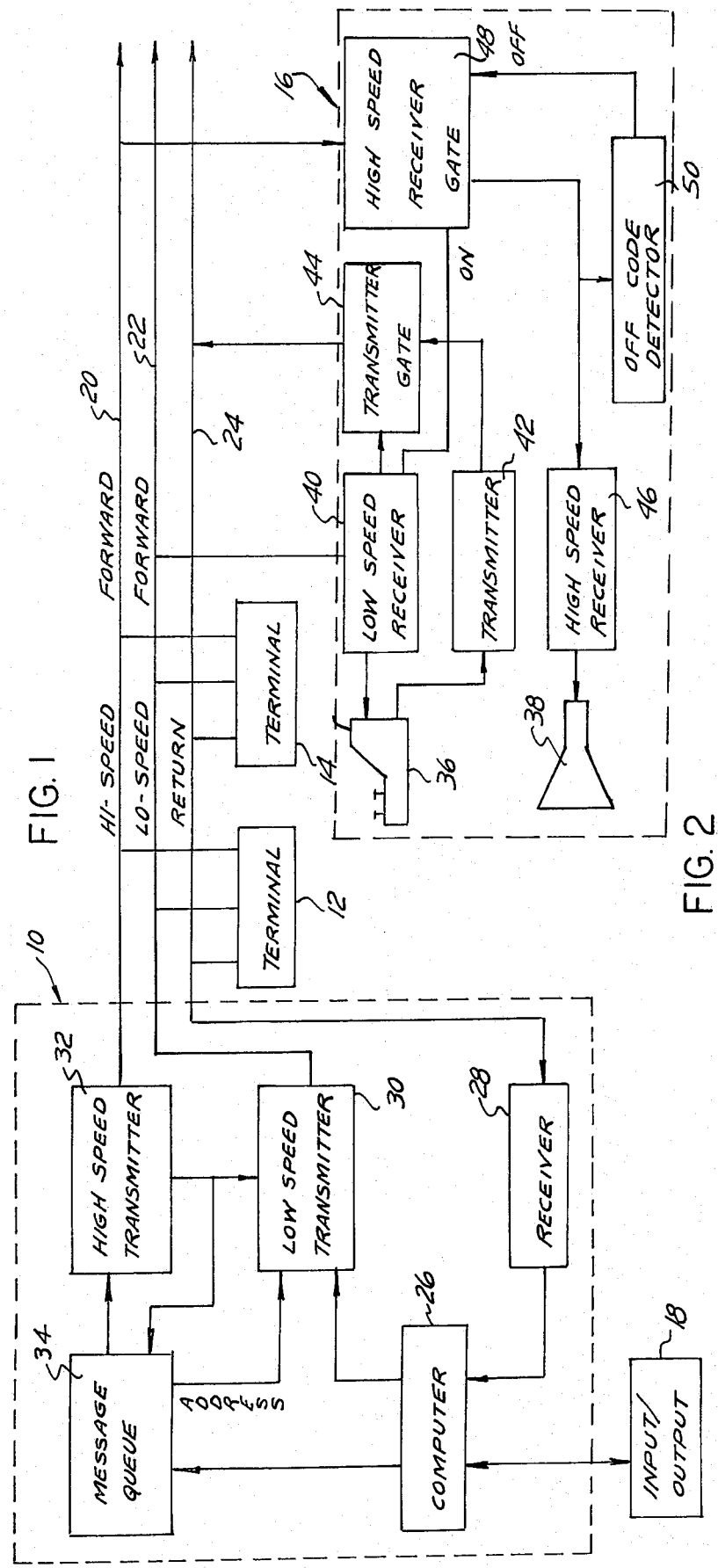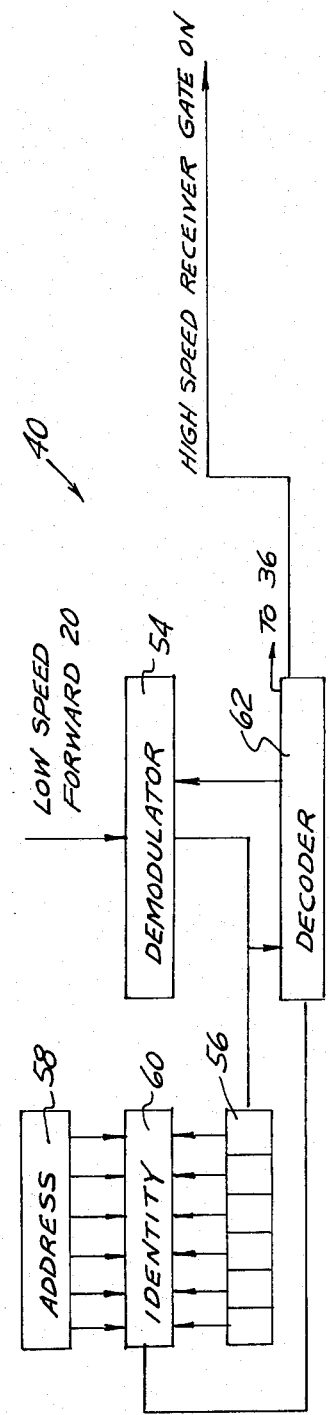

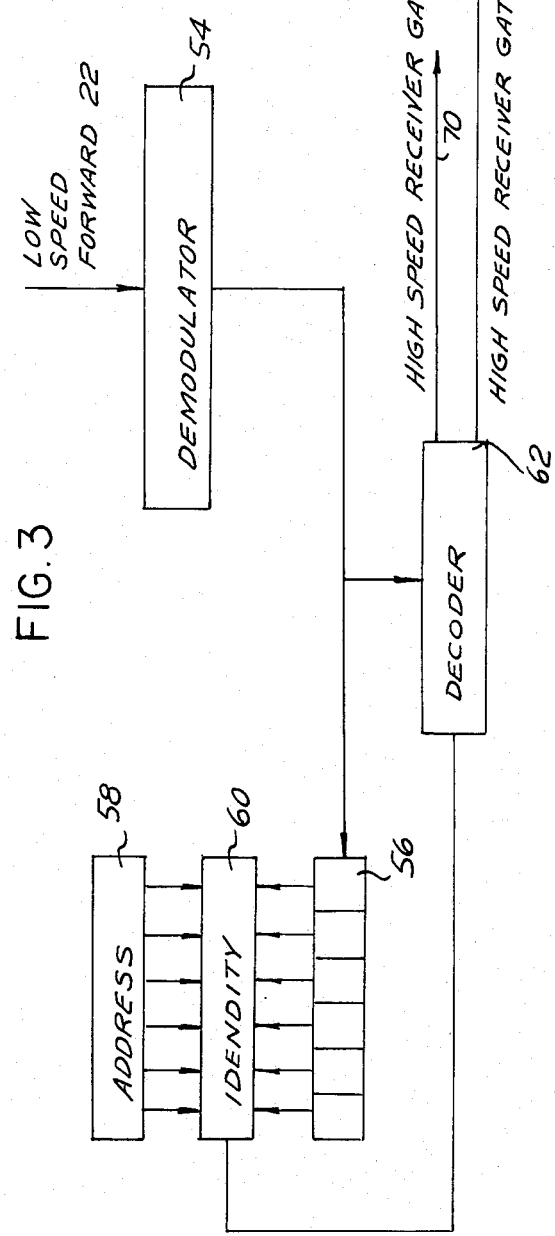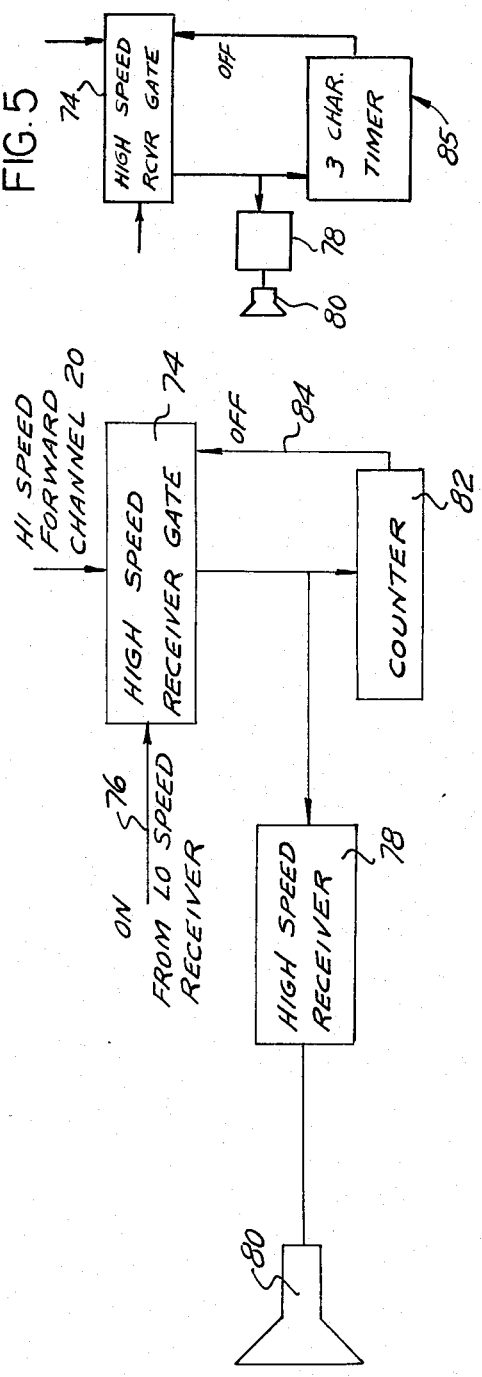

MULTIPLE TERMINAL COMPUTER SYSTEM WITH MIXED TERMINAL DATA RECEPTION RATES

BACKGROUND OF THE INVENTION

1. Field of the Invention

This invention relates to data information and processing systems employing a central station and a plurality of input and/or output terminals connected to the central station by a communication channel and more particularly to such systems wherein some of the terminals have a data acceptance and/or transmission rate which differs substantially from that of other terminals.

2. Reference to Related Patent Applications

U.S. Pat. application Ser. No. 345,945 entitled "Computer System", filed Mar. 29, 1973, now U.S. Pat. No. 3,821,706 discloses a remote terminal computer system which could be adapted to employ the concepts of the present invention.

3. Prior Art

Computer terminals having the ability to input and/or output data to a remotely located central computer station are commonly employed in commercial and industrial establishments such as banks and factories and in wired television program distribution systems such as CATV. A wide variety of input/output devices are available for use with these terminals ranging from simple pad type keyboards of the type used with touch-tone telephones to CRT displays with input storage and forwarding capabilities. These terminals differ widely in data reception and transmission capability: a teletype printer may have a maximum data reception rate of 110 bits per second while a CRT terminal is capable of accepting or transmitting data at rates in excess of several thousand bits per second. In previous multiple terminal systems employing terminals of such desperate data rates it has been the practice to provide a single forward data channel for messages from the central computer to the terminals having a sufficient capacity to carry data at the rate of the highest speed terminal on the line.

In those multiple terminal systems in which the terminals have the capability of addressing the central station, these return communications typically are carried over a single channel sequentially and means are provided for granting various terminals, having messages to be sent to the central station, access to the channel in some ordered manner. In one previously utilized class of systems this was achieved by the central station sequentially addressing the terminals over the forward channel and inviting them to return short messages to the central station over the return channel. This arrangement is relatively wasteful of forward channel capacity and in the aforementioned patent application a system is disclosed wherein each terminal has a unique address and contains a counter advanced by a single count each time a digital word is transmitted by the central station on the forward channel. When a terminal's counter reaches a count equal to its address the terminal may then provide a short message to the central station on the return channel if the terminal has a message to be returned. By this arrangement the terminals are "polled" at a rate controlled by the rate of transmission of digital words by the central station. The addition of a high data rate terminal, such as a CRT, in a system which largely comprises low speed terminals such as teletypes, dramatically increases the polling rate in a system of this type. Therefore, with a single channel for both low and high speed devices, there is a severe restriction on the total number of devices which can be rapidly serviced.

SUMMARY OF THE INVENTION

The present invention is directed to an improved form of multiple terminal system for use with terminals having a wide range of data reception and/or transmission rates which obviates the aforementioned problem and provides other improvements in the flexibility and mode of operation of such systems.

Broadly the present invention contemplates the provision of a second channel connecting the central station to each of the terminals in addition to the previously utilized forward channel. This second channel has a capacity sufficient to transfer data to and/or from the highest data rate devices connected to the system at their maximum rate and the first forward channel may have a lower date capacity commensurate with the data reception rates of the bulk of the lower speed terminals on the line.

The terminals are all connected to the low speed channel and receive data or control signals from the central station after being addressed on the low speed channel. When a message of any appreciable length is to be provided from the central station to a terminal having a high data rate capacity, or in the reverse direction from that terminal to the central station, that terminal is addressed on the low speed channel and then a control signal is provided to the terminal which enables it to receive or transmit a subsequent message on the high speed channel. After the terminal or terminals which are to receive or transmit a high speed message are so enabled, the message is sent out on the high speed channel at a data rate commensurate with the maximum rate of the terminals involved. The central station continues to send low speed messages on the low speed forward channel to other terminals during the transmission of this high speed message.

When the high speed message is completed a code signal is sent out to the terminal or terminals so enabled, either on the high or low speed channel, disabling their connection to the high speed line. A subsequent enabling signal may be then sent to one or more high speed terminals on the low speed line and another message transmitted to or from these terminals.

This system may be utilized with any multiple terminal system but has special advantages when used with systems which poll by means of internal counters associated with the terminal and advanced by digital words sent out by the central station. In such systems the transmission on the high speed channel does not have any effect on the terminal counters so that the polling rate is established by the rate of transmission on the low speed channel, substantially alleviating the sequential polled terminal problem.

The present invention confers greater flexibility on all systems employing multiple terminals. It allows messages of substantial length to be provided to high data rate terminals without increasing the waiting time for transmission of control signals or additional messages to the low speed terminals. Since human interaction with such systems is usually accomplished via low speed terminals this means the present invention minimizes delay and inconvenience for human interaction.

The high speed and low speed data channels may take the form of separate wired lines extending to all of the terminals or may be formed by frequency division multiplexing techniques on the same wired or radio channel.

Another aspect of the present invention relates to the use of a digital storage area at the central station to retain a plurality of digital messages to be sent out on the high speed channel in a queue or stack. The messages are each stored along with the address or addresses of the terminals that are to receive a particular message. When the transmission of one message on the high speed terminal is completed and the terminal or terminals receiving that message have been disconnected from the high speed channel, the address or addresses of the terminals to receive the next message in the queue are transmitted on the low speed channel, followed by a control signal which causes all of those terminals so addressed to connect to the high speed channel. The message is then sent on the high speed channel while simultaneous transmissions between the central station and other terminals take place on the low speed forward channel and the return channel.

The disconnect of any enabled high speed terminals from the high speed forward channel after the completion of a message transmission on that channel is preferably accomplished by the transmission of a coded disconnect signal on the high speed channel. Since only the terminals connected to that channel receive a message no addressing is required with this control signal. Alternatively, the high speed terminals connected to the line may include circuitry which automatically disconnects them after the reception of a message of a predetermined length. For example the high speed terminals will often be CRT displays and typically receive messages in the form of signals for displaying a single screen. Assuming a full screen consists of 512 characters, in one embodiment of the invention the high speed terminals will contain counters which count the digital words provided to the terminal. When the counter reaches the required count it automatically switches the high speed terminal off of the high speed channel.

Alternatively, the disconnect signal may be transmitted to those terminals so addressed on the low speed channel. This arrangement has the virtue of simplifying the high speed decoding mechanism since no control signals need be recognized. In those form of systems where messages may be addressed to all of the terminals simultaneously without individually addressing all of the terminals the high speed disconnect message may be sent in that manner, eliminating the need for particular addressing. In another alternative embodiment, the disconnect signal can be automatically generated within that terminal on the high speed line, when a predetermined number of character times pass without the reception of another character i.e., an automatic time out.

Similarly, the return high speed channel can be cointrolled by any one of the techniques described above for controlling the forward high speed channel.

Use of the system of the present invention allows a substantial simplification of the priority interrupts systems used to allocate a single forward channel which characterizes systems of the prior art, since messages of unusual length may be sent through the high speed forward channel without delaying transmission of priority control messages which may be sent over the low speed channel.

BRIEF DESCRIPTION OF THE DRAWINGS

Other objectives, advantages and applications of the present invention will be made apparent by the following detailed description of the preferred embodiment of the invention and several variations thereon. The description makes reference to the accompanying drawings in which:

FIG. 1 is a block diagram of a multi-terminal computer system forming the preferred ebmodiment of the invention, with the organization of one of the terminals having both a high speed and a low speed data output device illustrated in block form;

FIG. 2 is a block diagram in greater detail of the low speed receiver of a terminal used with the embodiment of FIG. 1;

FIG. 3 is a block diagram of an alternate form of receiver for use with the invention of FIG. 1;

FIG. 4 is a block diagram of another embodiment of the high speed receiver shut-off mechanism which might be used with the embodiment of FIG. 1; and FIG. 5 is a block diagram of another receiver configuration which automatically disconnects from the high speed channel a predetermined time after receipt of the last signal from that channel.

DESCRIPTION OF THE PREFERRED EMBODIMENT

Referring to the drawings the preferred embodiment of the multi-terminal computer system of the present invention, as illustrated in block form in FIG. 1, may be of the type employed within a factory as a data transfer, processing and display system. A central station, broadly indicated at 10, may be disposed in a factory office. A plurality of terminals, such as 12, 14 and 16, will be disposed at various locations throughout the plant. Information relating to the operation of the factory may be inputted through certain of the terminals for transmission to the central station 10. At the central station this information may be processed and made available through display or printer associated with an input-output device 18. The information, selected parts thereof, or various control commands may be provided by the central station to any of the selected terminals.

The central station 10 and the terminals 12, 14 and 16 are connected by three data channels, a high speed forward channel 20, a low speed forward channel 22 and a return channel cable and the three data channels are preferably carried by the same cable using frequency multiplexing techniques. For example, the required cable band width may be in the order of four megahertz for a one megabit data rate forward channel, plug 30 KHz for the low speed forward channel. Appropriate filters would be located in the central station and the terminals to select and detect these channels. Thus on a wide band cable there could be many such three-channel sets of frequencies available. A fourth channel could also be used to accommodate a high speed return channel.

Central station 10 preferably utilizes a stored program general purpose computer 26 to process data and control signlas provided to it form the terminals and the input-output device 18 and to control the overall operation of the system. The computer can receive messages from the input-output device 18 and from a receiver 28 connected to each of the terminals through the return channel 24. The computer may provide output on the unit 18 and may send messages to the terminals through a low speed forward channel 22 and through a high speed transmitter 32, connected to those of the terminals which have a high speed data reception capability by the high speed forward channel 20.

The central station also incorporates a digital storage device 34 which is termed the message queue. This may form part of the memory of the computer 26 or may be an external memory device such as a magnetic storage disc, or a solid state random access memory module. The memory queue 34 acts to retain messages which are awaiting transmission to the terminals via the high speed transmitter 32 and the high speed forward channel 20. It also stores the addresses of the terminals which are to receive these particular messages. Messages and addresses are loaded into the queue 34 from the computer 26.

The terminal 16, which has both high speed and low speed data reception capabilities, is illustrated in more detail than terminals 12 and 14. It includes a teletype transmitter and receiver 36 to originate and receive messages that are relatively of a low rate such as 15 or 30 characters per second, and a cathode ray tube display 38 capable of receiving and displaying information at a substantially higher rate, such as one thousand characters per second. The teletype unit 36 receives information from the low speed forward channel 32 by means of a low speed receiver 40. The output of the teletype is provided to the return channel 24 by a transmitter 42 operating through a transmitter gate 44. The gate is enabled by signals generated by the low speed receiver 40.

The CRT display 38 receives information from a high speed receiver 46 via the high speed forward channel 20, through a high speed receiver gate 48. This gate is enabled by another signal generated by the low speed receiver 40.

The system disclosed in FIG. 1 may use any technique to sequence the low speed transmissions from the terminals to the central station via the return channel 24. For example the computer 26 may transmit addresses of individual terminals followed by codes which allow those terminals to respond with messages on the return channel. Alternatively, each of the terminals could incorporate a counter which was continuously compared with the address of that terminal and advanced by all signals transmitted on the low speed forward channel 22. When the contents of one of the counters equates with the address of its terminal the terminal may then respond on the return channel 24. This is the arrangement disclosed in the previously referenced patent application.

Considering the operation of the system of FIG. 1 broadly, a message to be outputted on one of the teletype units 36 may be provided by the computer 26 to the low speed transmitter 34 after the address of the terminal to receive the message has been sent. The low speed receiver 40 associated with that terminal, having previously been enabled by the transmission of its address from the central station 10, accepts a message and outputs it on the teletype unit 36. The computer 26 also generates messages to be sent to the higher speed output devices such as the CRT 38 and provides them to the message queue 34 along with the addresses of the terminals which are to receive the message. These messages are normally stacked in order in the queue 34 although they may be rearranged for priority reasons.

When one complete message has been transmitted by the transmitter 30 any high speed receivers which are connected to the line are disconnected in a manner which will subsequently be described in detail. Then the addresses of the terminals to receive the next message in the queue are provided to the low speed transmitter 30 and are sent out on line 22. The low speed receivers 40 associated with those terminals recognize their addresses and upon receipt of a subsequently transmitted unique code provide signals to their associated high speed recieving gates 48 effectively opening these gates.

A message from the queue 34 is then provided to these terminals by the high speed transmitter 32 operating over the line 20. Only those high speed receivers which have previously had their gates enabled by a signal sent over the low speed channel will receive the high speed message.

The message received is demodulated by the receiver 48 and provided to the cathode ray tube display 38. When the high speed message has been completed a second special code is sent out by the high speed transmitter 32 and recognized by an "off code detector" 50 associated with the terminals previously connected. These codes cause the detectors to generate a signal which is provided to the associated reciever gate, disabled that gate.

Employing this arrangement the particular terminal may include a low speed output device 36 and a high speed output device 38 and will require both a low speed receiver 40 and a high speed receiver 46 and the other associated hardware. Alternatively, a terminal may only incorporate a low data rate output device such as the teletype unit 36 in which case it will not require the high speed receiver 46, high speed receiver gate 48 or the off code detector 40. If the terminal only employs a high speed output device such as the CRT 38 it will also require a low speed receiver 40 in addition to the high speed receiver in order to enable its receiver gate.

FIG. 2 illustrates the organization of the low speed receiver 40 in somewhat greater detail. The receiver includes a demodulator 54 which receives all signals from the low speed forward channel and converts them into suitable binary form for decoding. When an address is received by the demodulator 54 it is provided to a register 56. The receiver also contains a register 58 which contains the unique address of that terminal. The identity unit 60 receives the output of the terminal address 58 and the received address 56 and if the two are identical provides a signal to a decoder 62 enabling it to process a subsequent output of the demodulator 54. This decoding process continues until the decoder 62 recognizes an end of message code at which time an appropriate signal is sent to the demodulator and the demodulator again provides signals to the register 56 in a search for the terminal's address.

The decoder 62 sends messages to the teletype unit 36 and also provides various control signals to the terminal including the signal which turns on the high speed receiver gate 48. In those systems where the terminals are polled for messages to be returned to the central station by addresses transmitted by the central station, the low speed receiver will also provide a signal to the transmitter gate 44 when it is requested to transmit.

The high speed forward channel 20 could be complemented or replaced by a high speed return channel, similarly enabled and disabled.

As has been noted, in the system of FIG. 1 the high speed receivers which are connected to the high speed channel 20 are disconnected at the end of the transmission of each high speed message by a signal sent out over the high speed forward channel 20 by the high speed transmitter 32. Alternatively, any high speed receiver connected to the line may be disconnected by a control signal sent over the low speed forward channel 22 to all of those channels which have previously been addressed; or, in those systems wherein a special transmission may be sent to all of the terminals without the necessity of addressing, a general message may be used to turn off all connected high speed receivers at the end of a particular message transmission.

This variation of the receiver as illustrated in FIG. 3 employs a demodualtor 54, a register 56, an address store 58, an identity unit 60 and a decoder 62 similar to the receiver of FIG. 2. It differs from the receiver of FIG. 2 only in providing the decoder 62 with the capability of recognizing a first signal, sent out on line 70 which enables a high speed receiver gate and a second signal sent out on line 72 which turns off that gate at the end of a message transmission.

FIG. 4 illustrates another alternative receiver configuration wherein the transmission to the high speed output devices via the forward channel 20 are all of fixed length and the high speed receivers are disconnected from the high speed line after receiving a message of this length. A high speed receiver 74 is illustrated as receiving input from the high speed forward channel 20. The gate 74 is enabled by a signal received on line 76 by a low speed receiver associated with the terminal. Upon receipt of the signal on line 76 the gate 74 is open and provides the output of the forward channel 20 to the high speed receiver 78 which in turn services a CRT display output unit 80. The same high speed transmission is provided to a word counter 82 which has previously been reset to zero. The counter 82 is sensitive to word format and increases its count by one upon receipt of each word. Upon the counter 82 obtaining a predetermined count which is equal to the length of a standard message sent on the high speed channel a control signal is sent on line 82 to the receiver gate 74 turning the gate off. At the same time the counter 82 is reset to zero.

FIG. 5 illustrates another alternative receiver configuration when a "time out" is used to disconnect the high speed receiver from the high speed line at the end of a message. The receiver is enabled in the same manner as in FIG. 4. The connection is held until the timer 85 senses that a predetermined number of character times have passed without the transmission of a character. Thus, each message is ended with a blank period during which no characters are transmitted. In the illustration a three-character time out period is used.

With this form of high speed receiver turn-off arrangement when less than a full screen of information is to be provided to a CRT display unit the information is padded with blanks to make up the standard message size.

Having thus described our invention, we claim:

1. A data communication system having a master station and a plurality of remote terminals capable of receiving data from the master station, including terminals having a first, relatively low data rate, and terminals having a second, relatively high data rate, a cable interconnecting the master station and the remote terminals; first multiplexer means connected to the cable at the master station and each of the remote terminals to form a first data channel having a relatively low maximum data rate connecting said master station to all of said terminals; second multiplexer means connected to the cable at the master station and each of the remote terminals to form a second data channel having a relatively high maximum data range connecting said master station to all of said terminals; unique address means associated with each terminal; means associated with said central station for transmitting the address of any terminal to all of said terminals over said first channel; means at at least certain of said terminals for selectively connecting the terminal to the second data channel; and means associated with said certain terminals, responsive to the address of such terminal and a unique code signal, both sent over said first data channel, for enabling said means for connecting such terminal to the second data channel.

2. The system of claim 1 including means associated with the central station for sending out a second form of unique signal on the second channel; and means associated with said certain terminals for disconnecting those terminals from the second channel upon receipt of said second, unique signal form.

3. The system of claim 1 including means associated with the central station for sending out a second form of unique code signal on first data channel to particularly addressed terminals; and means associated with said certain terminals for disconnecting such terminals from the high speed data channel upon receipt of the said second unique code signal.

4. The system of claim 1 including means associated with said certain terminals for disconnecting said terminals from the high speed channel upon the receipt of a predetermined length message on said second channel.

5. The system of claim 1 including means associated with said certain terminals for disconnecting said terminals from the high speed channel in the event that the said terminals fail to receive a character on the high speed channels for a predetermined number of character times.

6. The system of claim 1 including means for transmitting messages from one of said terminals at a time to said central station.

7. The system of claim 1 including a storage means associated with said central station of storing a plurality of messages to be sent to said certain terminals via said second data channel along with the address of such terminals that such message is to be sent to; and means associated with the central station for causing the address associated with a particular message to be sent on said first data channel, along with a first unique code word and then to cause the message associated with said address to be sent out on said second data channel.

8. The system of claim 1 wherein the terminals having a second, relatively high data rate, to include video terminals.

9. The system of claim 7 including means associated with said certain terminals for disconnecting said terminals from the high speed channel upon receipt of a predetermined number of digital words over the high speed channel.

10. The system of claim 8 wherein said certain terminals include counters for storing the number of digital words received by it over the high speed channel and the means for disconnecting said certain terminal from the high speed channel is controlled by the counter.

11. The system of claim 8 including means associated with said certain terminals for disconnecting said terminals from the high speed channel in the event that the said terminals fail to receive a character on the high speed channels for a predetermined number of character times.

12. A data communication system having a central station and a plurality of remote terminals, including: a first relatively low rate communication channel connecting the central station to at least certain of said terminals; a second, relatively high speed communication channel connecting said central station to at least certain of said terminals; gate means for controlling the provision of the signals from the second high speed channels to the terminals connected thereto; and means at said terminals connected to first relatively low speed channel, responsive to signals sent over the first channel, for controlling said gate means of a particular terminal connected to said high speed channel.

13. The computer system of claim 10 wherein each of the terminals connected to said first low speed channel has a unique address associated therewith and said signal causing said means in such terminal for connecting an associated terminal to the high speed channel constitutes the address of such terminal and a unique code signal.

* * * * *

UNITED STATES PATENT OFFICE
CERTIFICATE OF CORRECTION

Patent No. 3,990,046                               Dated   November 2, 1976

Inventor(s) Harold W. Katz et al

It is certified that error appears in the above-identified patent and that said Letters Patent are hereby corrected as shown below:

Column 3, line 21 "1ow" should read --low--; line 58 "coin-" should read --con---.

Column 4, line 10 "ebmodiment" should read --embodiment--; line 48 after "return channel" insert --24. In a factory these data channels preferably constitute a--; line 62 "signlas" should read --signals--, "form" should read --from--.

Column 6, line 33 "hardward" should read --hardware--.

Column 8, line 10 "range" should read --rate--.

Column 9, line 10 after "including:" insert --a single communication channel divided into--; line 13 after "terminals" delete ";" and insert --and--.

Signed and Sealed this

Third Day of May 1977

[SEAL]

Attest:

RUTH C. MASON
Attesting Officer

C. MARSHALL DANN
Commissioner of Patents and Trademarks